Figure 1:
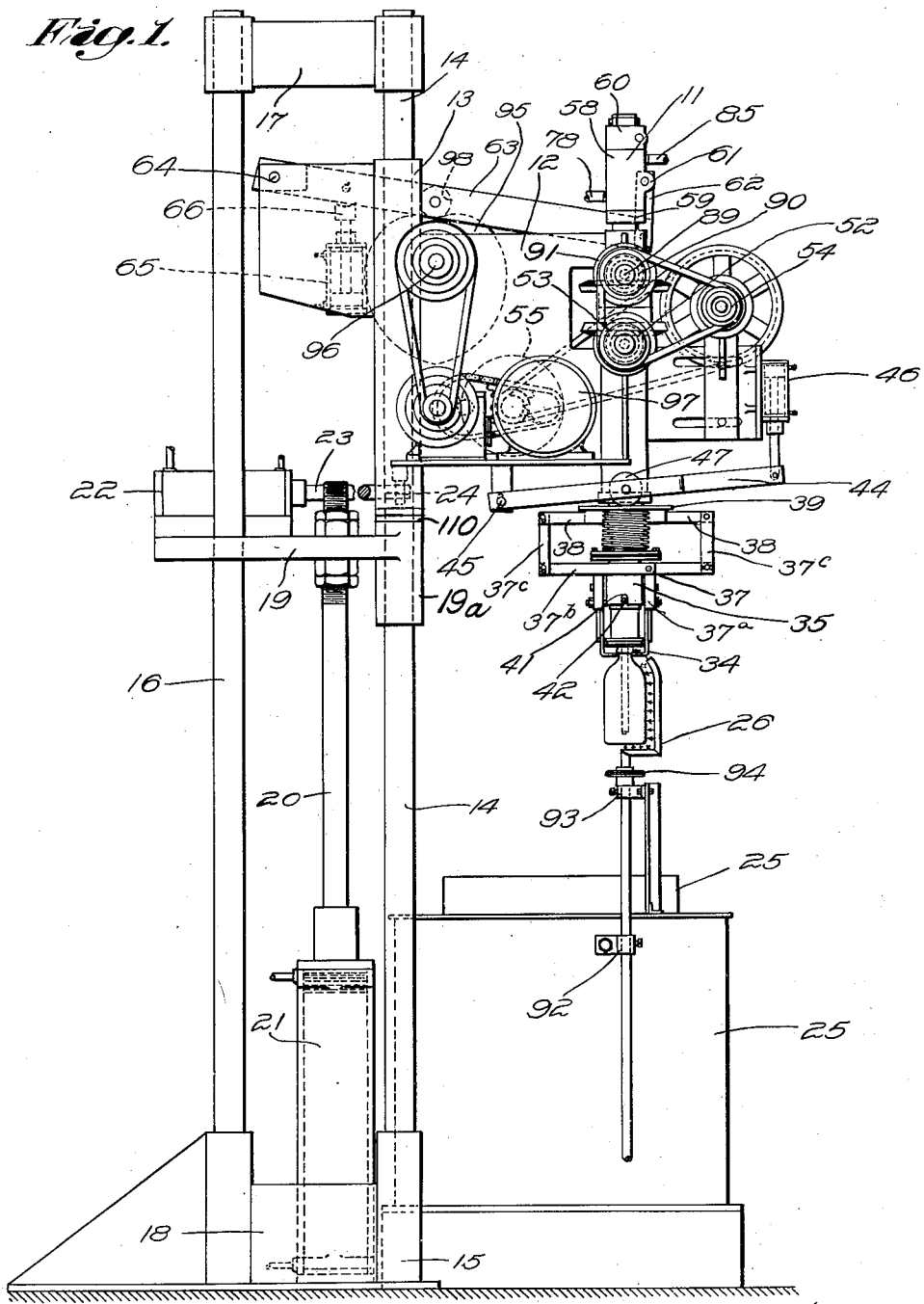

Dec. 27, 1949     T. D. GREEN     2,492,216
METHOD OF AND APPARATUS FOR HANDLING
AND TEMPERING GLASSWARE
Filed Nov. 25, 1939     3 Sheets-Sheet 1

Witness
W. O. Thayer

Inventor
Thomas D. Green
by Brown & Parham
Attorneys

Dec. 27, 1949  T. D. GREEN  2,492,216
METHOD OF AND APPARATUS FOR HANDLING
AND TEMPERING GLASSWARE
Filed Nov. 25, 1939  3 Sheets-Sheet 2

Witness
W. B. Thayer

Inventor
Thomas D. Green
By Brown & Parham
Attorneys

Dec. 27, 1949     T. D. GREEN     2,492,216
METHOD OF AND APPARATUS FOR HANDLING
AND TEMPERING GLASSWARE
Filed Nov. 25, 1939     3 Sheets-Sheet 3

Inventor
Thomas D. Green
By Burn & Parham
Attorneys

Witness
W. B. Thayer.

Patented Dec. 27, 1949

2,492,216

UNITED STATES PATENT OFFICE 2,492,216

METHOD OF AND APPARATUS FOR HANDLING AND TEMPERING GLASSWARE

Thomas D. Green, West Hartford, Conn., assignor to Hartford-Empire Company, Hartford, Conn., a corporation of Delaware Application November 25, 1939, Serial No. 306,085

23 Claims. (Cl. 49—47)

1

The present invention relates to tempering hollow glassware, particularly bottles and jars, which are formed with a neck finish. The term "neck finish" or at times simply "finish" is used herein with reference to an article of hollow glassware, such as a bottle or jar, to designate the portion of such article at the mouth end which is formed to take a cork or other closure and usually is externally enlarged to be gripped for handling during the manufacture of the article. Heretofore, such glass articles have been "annealed"; that is, subjected to a controlled slow cooling, chiefly effected through the outside of the ware, from a temperature above the upper annealing point of the glass to the strain point or lower annealing point, at which the glass is sufficiently set or rigid that no permanent stresses may be introduced by further cooling.

The annealing process is directed primarily to the minimization of stress in the glass article; whereas the tempering process has for its object the introduction of considerable stress and involves the sudden cooling of the surfaces of the glass from a temperature above to a temperature below the strain point. The process of annealing involves cooling during a matter from one-half to several hours, while tempering is a matter of chilling in seconds or minutes.

The present invention provides novel methods and apparatus for tempering bottles, jars and other hollow glassware, in which air, gas or other fluid may be caused to rapidly chill the surfaces of the glassware in a controlled manner and for handling the ware during the tempering thereof.

It has long been known that glass which has been tempered, as opposed to that which has been annealed, possesses highly desirable characteristics such as increased resistance to blows, pressure and temperature changes. Also it has been long known that flat glass plates and similar articles of substantially uniform thickness and of simple form may be tempered by bringing the same to a substantially uniform temperature close to their softening points, and rapidly chilling them by immersion in a suitable chilling bath, or by blowing or spraying all their surfaces with a chilling medium.

Although as early as 1875, Pieper proposed to temper bottles in the latter manner, the proposal was based on the erroneous assumption that bottle walls were of substantially uniform thickness. Such proposal, as far as I am aware, failed to result in the commercial production of tempered bottles, and it may be assumed that it

2 came to naught through the failure to solve the very considerable difficulties inherent in the variations in the thickness of various parts of bottle walls, in the shape of the bottles, and in the fact that the internal cooling must be accomplished by means which may pass through the restricted neck opening of the bottle. Research work which has been carried on by me and a group of associated engineers, has demonstrated that these difficulties are great and are not overcome by following this early proposal.

Though bottles and jars of different types vary somewhat in the distribution of glass in different portions of their surfaces, it is characteristic of nearly all of these articles that the bottom wall and the walls of the neck or finish are thicker than the side walls. Moreover, many of these bottles have side walls which vary in thickness both by reason of the design of the articles and the methods of manufacturing them. The bottoms of the articles usually join the side walls at angles of about 90°. The opening in the bottle, adjacent the finish, is frequently quite restricted and is nearly always of smaller cross-section than the body of the bottle. The body and neck portions are connected by sloping shoulders, in which the distance from the axis of the bottle varies considerably. Articles such as these cannot be satisfactorily tempered by the methods and means heretofore applied to glass plates and similar simple forms of ware. Such glassware is not satisfactorily tempered either by extracting heat from all surfaces at the same rate, as with plate glass, or even by effecting a uniform value of stress in all parts of the walls.

If a bottle having a heavier bottom than side walls is chilled from a highly heated condition by uniform application of a cooling medium, the side walls of the bottle will pass from the plastic to the "set" stage ahead of the bottom, with the result that continued cooling of the bottom will tend to draw in the bottom portions and set up undesirable secondary strains in a belt surrounding the lower portion of the bottle. Other such strains may arise at the juncture of the finish portion and the shoulders.

It is, therefore, important to obtain very accurate and exact control of the application of cooling medium to the various portions of the bottle, so that the desired rate of chilling of each of the several different portions of the bottle be such as to avoid the creation of excessive secondary stresses which might otherwise render the tempered bottle unfit for its intended purpose.

It is also important that the instrumentalities employed in the handling of a bottle while it is being tempered exert the minimum temperature changing effect on the bottle and a minimum obstruction to the application of the chilling medium, while at the same time maintaining the bottle securely in an accurately determined position to assure the introduction axially into the bottle of the internal cooling means and the properly controlled application of the cooling medium both internally and externally.

The method of my invention comprises the combination and sub-combinations of the steps of supporting the ware to be annealed by its finish, locking it while so supported in a position in which its axis is in alignment with that of an internal cooling nozzle adapted to project through the finish opening into the ware, applying internally of the bottle a jet or jets of cooling fluid impinging on the internal walls of the ware, selecting and regulating the application of such jets on various parts of the walls in accordance with the character of the parts (their thickness, distance from the bottle axis and/or their shape), and the degree of temper desired in each part, applying and regulating the application of cooling medium to various parts of the exterior of the ware to obtain a proper balance between the interior and exterior cooling and to place all the surfaces of the ware under compression.

The method may include the application of jets which are caused to scan the surface of the glass through rotation or oscillation of the ware or of the jet, or both, and/or by reciprocation, or by both rotation or oscillation and reciprocation.

Also the method may be carried out without such scanning by the provision of jets suitable in size, number and position to effect the desired distribution of the cooling effect.

The method may also include heating the ware while it is supported by the finish in a suitable oven or other heating means, and the movement of the ware from the heating means to a cooling station.

The apparatus provides a novel combination and subcombinations of centering and ware-supporting tongs arranged to center and support the ware during its heating and/or cooling, means contacting the rim of the ware and cooperating with the tongs to lock the ware firmly in centered position, means for causing the tongs to open and close and for causing relative movement between the tongs and the locking means, an internal cooling nozzle mounted in the tongs holder and in line with the opening in the ware, and arranged to project into the ware, the nozzle preferably being movable into and out of the ware, means for rotating the nozzle about its axis or the axis of the ware, means for rotating the tongs while gripping the ware, both of which rotating means are so arranged as to permit their being thrown out of operation while other parts of the apparatus are at work, means for moving the tongs and nozzle between a plurality of positions which may be a heating position and a cooling position, and external cooling means operative at the cooling station which may be either rotary or stationary.

It may also provide means for imparting a reciprocating movement to the nozzle, while it is in the ware, to aid in scanning the walls by jets of air from the nozzle.

Figure 2:
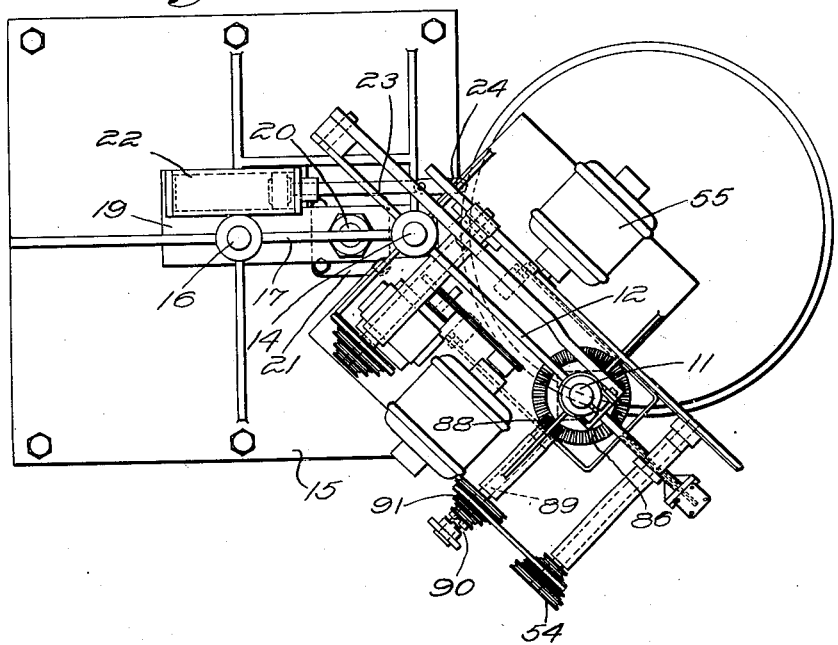
Figure 4:
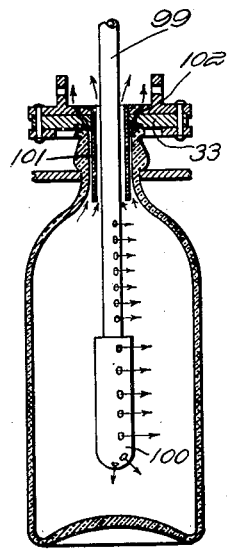
Figure 3:
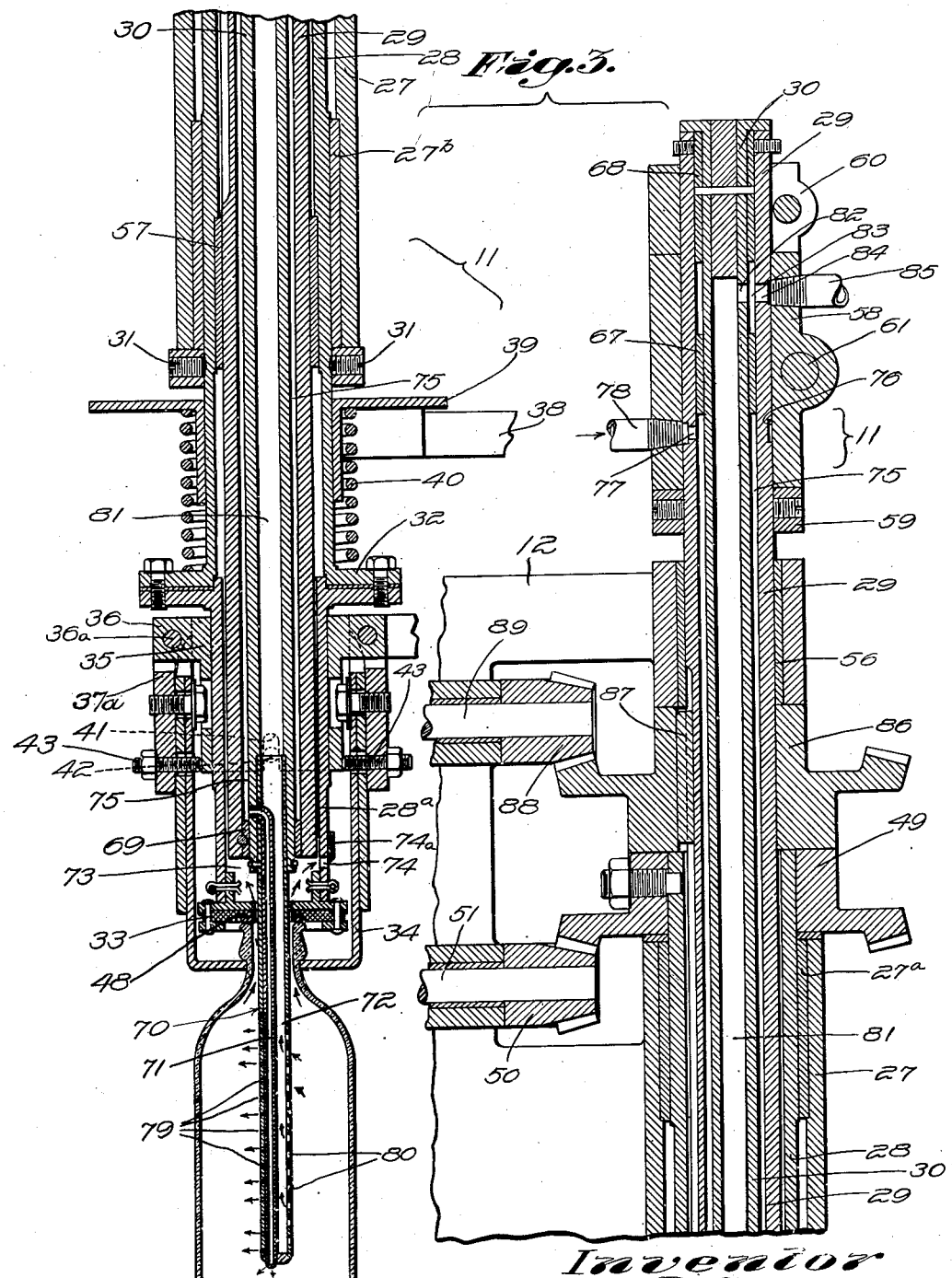

Other novel features will appear from the following specification and drawings, in which Figure 1 is a side elevation of one embodiment of the apparatus of my invention, showing the various parts in position at a cooling station, Fig. 2 is a plan view of the apparatus of Fig. 1, Fig. 3 is an enlarged view in vertical section of the tongs and internal nozzle mechanism, and Fig. 4 is a view of a nozzle adapted for use in the device of Figs. 1 to 3, inclusive.

Referring particularly to the drawings, the embodiment of my present invention there shown is particularly designed for use with air as the cooling medium, but is readily adapted for use with other gases or with a spray of liquid. It comprises a combined tongs and nozzle carrying spindle 11 carried by a bracket 12 which is integral with a sleeve 13 mounted for rotary movement about a vertical pillar 14 arising from a base 15. The pillar is suitably supported and reinforced by a second pillar 16 and upper and lower tie members 17 and 18. A crosshead 19 is slidably mounted on the pillars 14 and 16 and may be given vertical reciprocation by the piston rod 20 of an air motor 21. The crosshead 19 supports an air motor 22 having a piston rod 23 connected by a suitably pivoted link 24 to a portion of the bracket 12. A tubular vertical portion 19a of the crosshead 19 surrounds the pillar 14 beneath the sleeve 13, being spaced from the latter if desired by a vertically slidable washer or annular thrust bearing unit 110. The arrangement is such that the sleeve 13 and the parts integral therewith and carried thereby may be raised and lowered by upward and downward movements of the crosshead 19 and also may be oscillated angularly about the axis of the pillar 14. The air motor 21 thus may be employed to raise and lower the spindle 11 and tongs which are movable therewith as hereinafter described, from and to an article pick-up position, which may be such as to position the tongs within a heating furnace indicated at 25 in Fig. 1. When the spindle and tongs and the article gripped by the tongs have been raised by the air motor 21, as to the level shown in Fig. 1, the air motor 22 may be operated to swing the bracket 12 about the axis of the pillar 14 to swing the article gripped by the tongs angularly about the same axis to an article cooling position at which such article is adjacent to an external cooling nozzle 26, as shown in Fig. 1.

The spindle 11 (Fig. 3) comprises an outer tubular member 27 integrally or otherwise permanently connected to the bracket 12. A second tubular member 28 is mounted within the member 27, being spaced therefrom by bearing rings 27a and 27b and held against longitudinal movement relative thereto, as by set screws 31. The member 28 terminates at its lower end in a flange 32 to which is bolted a similar downwardly projecting tubular member 28a which carries a bottle steadying and locking member 33, hereinafter described.

A sleeve or annular tongs head 35, having ears 36, is mounted for limited sliding movement on the member 28a, the sleeve being provided with a slot 41 cooperating with pin 42 in the member 28a to limit said sliding movement which allows axial movement of the tongs 34 bringing the bottle into contact with locking means 33. Bell crank levers 37 are pivotally mounted on the ears 36, being attached thereto by pins 36a. The vertical arms 37a of the levers serve as holders for tong fingers 34. The fingers may be cut away to provide a four-point contact with the glass. The horizontal arms 37b extend across the spindle and are connected by links 37c to the ends of a crosshead 38 secured to a perforated plate 39 which is mounted to slide on the member 28.

A coil spring 40 is interposed between the plate 39 and flange 32, and tends to bias the plate 39, cross head 38 and sleeve 35 to their upper positions, at which the tong fingers 34 are closed in ware-supporting position. The extent to which the crosshead and other parts may move upwardly is limited by clearance between the bottle and the locking means. The accurate centering of the tong fingers is assured by the adjustable set screws 43 and the accuracy of the construction of the ears 36, pins 36a and tong holders 37a.

The plate 39, the lever 38 and hence the ring 35 may be moved in opposition to the spring 40 to open the tong fingers and to lower them by means of a bifurcated lever 44 (Fig. 1), one end of which is pivoted, as at 45 on a downwardly projecting part of the bracket 12. The lever 44 is pivotally connected at its other end to an air motor 46 and carries intermediate its ends a pair of rolls 47 which bear upon the upper face of the plate 39. When the lever 44 is depressed, the sleeve 35 and the tongs move downwardly until the pin 42 arrests further movement and the tong fingers open. When the pressure is relieved upon the plate 39, the tong fingers are closed about the finish of the glassware and are then lifted to bring the rim of the ware into firm contact with the locking member 33, which may be of annular, disk-like form, as shown. Any tendency for the tongs to assume an asymmetrical position is prevented by set screws 43.

Preferably the locking member 33 is made of "Transite" or other insulating material and may be suitably recessed to carry a ring of relatively soft packing material 48 when, as is sometimes desired, scrubbing of the rim by the cooling fluid or air is to be prevented, or it may be perforated or serrated to encourage such scrubbing, as indicated in Fig. 4.

It has been found desirable at times to prevent all or substantially all communication between the interior of the bottles and the atmosphere except through passages in the cooling nozzle within a neck shielding tube.

Rotation of the tongs 34, locking member 33 and the ware about their common axis may be provided when desired, though it is to be understood that such rotation may not always be employed. To this end the tubular member 28 is secured adjacent its upper end to a beveled gear 49 which meshes with a beveled pinion 50, on a horizontal shaft 51 which is connected through a clutch 52 to a pulley 53 driven through a pulley 54, and suitable connections from a motor 55 mounted on the bracket 12.

The spindle 11 also carries the internal cooling nozzle, passages for supplying and exhausting fluid through it to and from the ware, and mechanism through which the nozzle may move vertically and may be rotated.

Coaxial with, within and spaced from the tubular members 28 and 28a is a tube 29 which extends upwardly beyond the member 28 and through a bearing 56 in the bracket 12. A second bearing for the tube 29 is provided by the bushing 57 between it and the member 28. Above the bearing 56, the tube 29 passes through a sleeve 58, within which it is held from sliding movement by the collars 59 and 60. The sleeve 58 is provided with an ear 61 providing a pivot for a link 62 (Fig. 1) connected to a lever 63 which is pivoted at its opposite end at 64 to an extension of the bracket 12.

The bracket 12 also carries an air motor 65 having an upwardly extending piston rod 66, the upper end of which is located beneath the lever 63. When the piston rod 66 is at the lower limit of its vertical stroke, as shown in Fig. 1, the lever 63 is supported by a cam roll 98 on the peripheral surface of a cam 95 and is oscillated vertically by the rotation of the latter about the axis of the horizontal cam-supporting shaft 96 for a purpose to be hereinafter explained. When the piston rod 66 is raised by the air motor 65 to the upper end of its stroke, it will lift the lever 63 above the highest part of the cam and will retain the nozzle 70 in an elevated position within the tube 28a of the spindle 11 with the lower end of the nozzle above or not appreciably below the level of the locking member 33. This position of the nozzle in the spindle is desirable during the downward movement of the spindle to an article pick-up station and until the article picked up by the tongs has been raised by them against the locking member 33 so as to be secured firmly to the spindle in axial alignment therewith. It may be desirable to retain the nozzle in its elevated position until the spindle and the article carried thereby have been raised from the pick-up station, particularly if such station is in a zone of high temperature, as within the heating furnace 28. At an appropriate time after the article has been picked up by the tongs and the clamped at its rim against the locking member 33, the piston rod 66 may be lowered, as to the position shown in Fig. 1, thereby allowing the lever 63 to descend onto the cam and lowering the nozzle 70 axially into the supported article of glassware centrally of such article.

Within the tubular member 29 is a tubular member 30, which is spaced from member 29 by the packing rings 67, 68 and 69. The member 30 is arranged to detachably support an internal cooling nozzle 70 having a cooling fluid inlet passage 71 and an exhaust passage 72. The inlet passage communicates with the space 75 between the members 29 and 30, and thence through a groove 76 and port 77 in the member 29 with a pipe 78 which is flexibly connected with a source (not shown) of cooling fluid such, for example, as compressed air or steam.

The cooling medium is introduced into the ware by way of the holes 79 provided at suitable places along the length of the nozzle 70 and of suitable sizes to effect the desired chilling of the various parts of the bottle. The cooling fluid as it becomes heated may be exhausted from the bottle through the holes 80, passage 72, passage 81 within the member 30, and thence through opening 82, the annular space 83, opening 84 in the member 29 and exhaust pipe 85. If desired, the cooling medium may be supplied through the pipe 85 and the exhaust may take place through the passages communicating with the pipe 78, in which event the arrangement of discharge and exhaust holes 79 and 80 in the nozzle may be different from those shown.

If desired, a controlled portion of the cooling medium may pass through the annular space between the nozzle 70 and the inner wall of the neck of the ware to aid in chilling the neck wall. Such gases, after passing the neck, enter the space 73 and then are exhausted through an opening 74, the size of which may be regulated by a slide damper 74a.

The nozzle 70 may be rotated either with or without the rotation of the glassware. If the latter is rotated, the rotation of the nozzle is preferably in the opposite direction. The means for rotating the nozzle comprises a beveled gear 86 keyed as at 87 to the tubular member 29 and meshing with a beveled pinion 88 on a shaft 89 which is connected through a clutch 90 with a pulley 91 driven from the pulley 54.

Though I have shown and described means which may be employed for rotating the nozzle and the ware to be tempered relatively one to the other, it is to be understood that I may, if desired, employ means for causing a relative oscillation of the nozzle and/or the ware. Mechanical means to impart suitable oscillatory movement to either or both of the beveled gears 49 and 86 are known and may be substituted for the rotary means shown by those skilled in the art.

It is further contemplated that the mechanism shown and described may be employed while the ware and the nozzle are stationary, a suitable nozzle being provided to accomplish the desired results.

While I have shown in Fig. 1 a bottle which is circular in cross section, it is contemplated that the device may be employed for the tempering of bottles having other cross sectional forms, such as oval and panel bottles.

Provision has been made for vertical movement of the internal nozzle which may be used if desired to aid in distributing the cooling fluid over the walls of the ware. Such movement, if employed, will preferably take place in predetermined manner to effect the desired distribution of the cooling effect to various parts of the ware. The means for accomplishing this vertical reciprocation comprise the cam 95 mounted on the shaft 96 carried in suitable bearings in the bracket 12 and driven through suitable connections from a motor 97, also carried on the bracket. The lever 63 is provided with the cam roll 98 by which motion is imparted by the cam to the lever and therethrough to the nozzle 70.

The contour of the cam shown in Fig. 1 of the drawings is merely a formal one. For any particular type of bottle and nozzle employed, the cam is to be given a contour suitable to the desired distribution of the coolant in the bottle. It is obvious that the arrangement is such that the cam may or may not be employed, as desired, and that it may be employed with or without the relative rotation of the bottle and the nozzle.

I have illustrated diagrammatically an external cooling mechanism 26 which may be mounted on a support as, for example, the edge of a heating furnace 25, in bearings 92—93 and provided with a sprocket 94, by which, through suitable connections (not shown), the member 26 may, if desired, be rotated to scan the outer surface of the bottle. I contemplate the provision in the member 26 of outlets for cooling fluid of suitable size and suitably arranged to distribute the cooling fluid to the exterior of the ware in accordance with cooling effects desired on the several parts of the exterior of the ware. The member 26 need not be rotated but the bottle may be rotated relatively thereto by the means heretofore described. In the event that neither the bottle nor the exterior cooling device 26 is to be rotated, the member 26 may take the form of a basket or series of rings into which the bottle may be lowered to supply suitably distributed jets to accomplish the desired purpose.

For some purposes an adequate temper may be imparted to the ware by the employment of the internal cooling means without the employment of the external cooler 26, the external cooling effected by radiation being sufficient for certain purposes. Such radiation may be to surroundings at normal or even at elevated temperatures.

The apparatus disclosed herein is designed to permit the start of the application of the cooling medium by the internal and external nozzles at different times, and I contemplate its use in such manner. Particularly I have found it advantageous in tempering certain types of glassware to apply the internal cooling jets immediately upon, or even somewhat prior to the removal of the articles from an equalizing furnace, and substantially ahead of the application of jets from the external cooler. In such cases this practice makes for a greater symmetry of cooling, or for an assymetry of cooling which may be desirable to oppose tendencies to create secondary stresses in certain zones of the walls.

I also contemplate that the invention may be employed with or without the use of a temperature equalizing furnace, as such a furnace may not be necessary in the event that the ware be gripped by the tongs soon enough after the molding operations, so that it is at sufficiently high temperature for tempering, and provided the distribution of the heat in various parts of the bottle is sufficiently accurately known that the distribution of the cooling medium may be suitably adjusted to that condition. It will be obvious that in such event, the newly formed bottles may be set out or brought to a pick-up station corresponding to the position of the furnace 25, at which position the tongs may be employed to there pick up and center the ware.

As heretofore indicated, the nozzle 70 (Fig. 3) is merely shown by way of illustration and as one form of nozzle which may be employed with advantage. No attempt has been made in the drawing to illustrate any particular desirable distribution or size of openings 79 or 80 but merely to indicate that openings generally arranged as indicated may be employed.

It will be observed that the arrangement of the nozzle is such that a major portion of the cooling medium is introduced and exhausted from the ware without scrubbing the wall of the finish. This feature is desirable particularly where the opening in the bottle is small as compared to the volume of cooling fluid to be employed, as it contributes to control of chilling of the neck.

Fig. 4 shows a nozzle having a stem 99 and an enlarged head 100. This stem is surrounded by a neck shielding member 101 of stainless steel, other metal, glass or insulating material which may have an outwardly turned flange adapted to seat upon a shoulder on the locking means 33. Passages, as at 102, may be provided in the locking means for the escape of fluid from the restricted space between the neck shielding member 101 and the inner wall of the neck of the bottle that is being cooled. In the employment of this nozzle in the apparatus heretofore described, the cooling fluid enters by way of pipe 85 and is exhausted by way of pipe 78, the fluid being discharged into the bottle in special jets, one of which is directed diagonally toward the lower corners of the bottle. A nozzle of this character is designed for rotation of the glassware and/or the nozzle. If desired, it may be moved vertically in a manner determined by the characteristics of the several sections of the glass to which the jets are directed.

My invention may be employed to advantage with all kinds of bottles, jars and similar hollow ware having a single opening and a finish, suitable variation being made in the temperature, pressure and volume of the chilling medium employed and in the pattern of the application thereof.

One procedure which is recommended to effect suitable tempering of a series of similar articles as, for example, bottles, is as follows:

Unless the data is at hand from previous operations, a sample of the bottles is examined and measured to ascertain the thickness of the various parts of the walls, the distance of various parts from the place at which the cooling jets are to originate, the shape of the different parts and the use to which the bottle is to be put, and hence the character and location of the stresses to be developed. From this examination, suitable internal and external cooling nozzles are prepared having jet openings and/or exhaust openings spaced, directed and sized to give the desired distribution of the cooling fluid. One or more of the bottles are then treated, usually but not necessarily, by bringing them to uniform temperature between the strain point and the softening point of the glass, this conveniently being done by suspending them by their finishes in an equalizing furnace. Thereafter the air motors are actuated to lift the bottle from the furnace, project the cooling nozzle into the bottle and to swing the assembly to its cooling position adjacent the external cooling nozzle. The cooling fluid is applied to rapidly chill the entire bottle inside and out. If the bottle be circular in cross section, relative rotation of the bottle and of the cooling nozzles is preferably employed.

The pattern of cooling may be one by which all parts of the bottle walls pass the strain point at the same time, which may be effected by extracting heat from the various portions of the walls at rates which may vary directly as the thicknesses of the parts. Such cooling, if effected symmetrically, will result in a tempered bottle which is free of secondary stresses, i. e., stresses caused by the force exerted on an earlier set part by the contraction of a later setting part.

However, to effect such cooling in many kinds of bottles is an extremely difficult feat, particularly where the thin walls are very thin and the thick walls are substantially thicker than the thin ones, for example, over twice as thick. Such thin walls must be very rapidly chilled to assure a satisfactory temper therein, and if the thicker bottoms are to be chilled at several times the rate of the thin walls in order to get them through the strain point at the same time as the thin walls, the problem of distribution to the inner walls by means which may enter the bottle becomes more of a laboratory than a practical factory operation.

Our research has established that the ideal distribution of cooling which assures the absence of all secondary stresses is not essential to the practical production of tempered bottles, but that a bottle of improved strength may be produced which contains such secondary stresses so long as such stresses are sufficiently opposed by primary stresses that, at the end of the tempering operation, the surface layers of the walls are in compression.

Irrespective of the cooling pattern employed, the initial bottles are treated as above described and are then examined through a polariscope after they have been immersed in a bath of liquid having a similar index of refraction to the glass of the ware. Preferably the image of the ware is magnified and thrown upon a screen to facilitate the examination. Such an examination will reveal whether or not any surface areas of the bottle are in tension, and hence will indicate the parts of the bottle in which the tempering is defective or inadequate. As as result of this examination the nozzles to be employed are corrected or other nozzles substituted to give a local increase in the chilling effect, and to thus create additional primary stresses opposing the secondary stresses, and placing the surface of the bottles in compression. After this correction, other bottles of the series are then tempered as above described. The inspection and correction may, of course, be repeated throughout the operation whenever necessary or desired.

Other procedures may be employed and the apparatus herein shown and described may be modified without departing from the invention as defined in the following claims.

Having described my invention, what I claim is:

1. Apparatus for handling and tempering glassware having a finish, comprising a carrier, means carried by the carrier for supporting the ware in axially vertical position, a cooling nozzle, means mounted on said carrier for supporting said nozzle for vertical movements relatively to the carrier, a cam for moving the nozzle axially along a path extending vertically into the ware when such ware is supported in axially vertical position by the means carried by the carrier, and connections for supplying cooling fluid to said nozzle.

2. Apparatus for movably supporting and tempering an article of glassware having an open end portion, comprising a support mounted for movements between two vertically different positions, means for moving said support between said two positions, tongs carried by said support for movement therewith and comprising cooperative members movable relatively to one another to engage and disengage the open end portion of the article of glassware, a cooling fluid discharge nozzle, means for mounting said nozzle in vertical position for movement with said support and for reciprocation axially relatively to the support in a path extending between the members of said tongs and means for reciprocating said nozzle axially in said path.

3. Apparatus for handling and tempering glassware having a finish, comprising heating means operative at one station and external cooling means effective at another station, a ware-supporting and internal cooling mechanism movable between said stations, and comprising a support, an arm mounted on said support for movements between said stations, a carrier carried by said arm, tong fingers pivotally mounted on said carrier, means for moving said tong fingers about their pivots to grip the ware at the finish and suspend it from the carrier, a cooling nozzle, means carried by said carrier for supporting said nozzle in vertical position for longitudinal movements axially into and out of the ware while such ware is suspended from the tong fingers, means for moving the nozzle into and out of the ware, means for supplying cooling fluid through the nozzle to the interior of the ware at the cooling station, means carried by the carrier adapted to contact the rim of the ware while the same is suspended by the tong fingers, and means for moving said arm to move said carrier between said heating and cooling stations.

4. The method of handling and tempering glassware having a finish at the open end thereof, comprising suspending hot ware by its finish portion between cooperative tong members which grip the finish portion of the ware, applying pressure against the open end of the ware in the direction of length thereof and toward said tong members to lock said ware firmly to said tong members, cooling the internal surface of the suspended article by directing jets of cooling fluid against said surface from longitudinally spaced jet holes in a cooling fluid discharge nozzle projecting into the ware, and causing relative rotary movements between the jets of cooling fluid and the ware.

5. The method of handling and tempering glassware having a finish at the open end thereof, comprising suspending hot ware by its finish portion between cooperative tong members which grip the finish portion of the ware, applying pressure against the open end of the ware in the direction of length thereof and toward said tong members to lock said ware firmly to said tong members, cooling the internal surface of the suspended article by directing jets of cooling fluid against said surface from longitudinally spaced jet holes in a cooling fluid discharge nozzle projecting into the ware, causing relative rotary movements between the jets of cooling fluid and the ware, and removing the cooling fluid from the interior of the ware after contact of such fluid with the internal surface of the ware through a passage out of contact with the internal wall of the finish portion of the ware.

6. In apparatus for handling and tempering hollow glass articles having neck finish portions, a vertically disposed individually rotatable tubular member, a second individually rotatable tubular member located within said first tubular member, a tongs mechanism carried by said first tubular member for releasably gripping the neck finish portion of a hollow glass article to support said article below and in line with the tubular member, a cooling fluid discharge nozzle carried by the second tubular member in position to depend into the thus supported hollow glass article, and means to rotate said tubular members in opposite directions.

7. In the art of cooling a hot hollow glass article, such as a bottle or jar, which has a hollow body open at only one end thereof, the method which comprises discharging cooling fluid under pressure into the space within the hollow body of such an article while the glass thereof is at a temperature above its strain point, and removing cooling fluid from the interior of said hollow body through the open end thereof in two separate outflowing streams, one of which is in contact with and the other is spaced from the inner wall of the open end portion of said hollow body.

8. In the art of cooling a hot hollow glass article, such as a bottle or jar, which has a hollow body portion open at only one of its ends and is of relatively reduced cross-sectional area at its open end portion, the method which comprises blowing a cooling fluid against the inner wall of the relatively larger body portion of such an article from a nozzle which projects through the open end portion of the article into said body portion in spaced relation with the inner wall of said open end portion, removing only a predetermined part of the cooling fluid supplied to the interior of the body portion of the article in an outflowing stream moving through the open end portion of the glass article in contact with the inner wall thereof, and removing a further part of such cooling fluid from the interior of the body portion of the article in a separate outflowing stream which is completely out of contact with the inner wall of said open end portion of said article.

9. In the art of cooling a hot hollow glass article, such as a bottle or jar, which is open at only one end thereof and is of relatively reduced cross-sectional area at its open end portion, the method which comprises discharging cooling fluid under pressure into the space within the body portion of such an article at a rate and to the extent desired for rapid cooling of the inner wall of said body portion, removing a part only of the cooling fluid supplied to the interior of the body portion of said article in an outflowing annular stream scrubbing against the inner wall of the open end portion of the article, and concurrently removing other cooling fluid from the interior of the body portion of said article in a separate outflowing stream located within the confines of said annular stream and completely out of contact with the inner wall of said open end portion of the article.

10. In apparatus for cooling the internal surface of a hot hollow glass article, such as a bottle or jar, which has a hollow body portion provided at one end with an open portion of relatively reduced cross-sectional area, an elongate hollow structure adapted to project into the body portion of such an article through and in spaced concentric relation with the inner wall of the open end portion of said article, said elongate hollow structure having a longitudinally extending passage formed therein for supplying cooling fluid under pressure from an external source of supply to the interior of the glass article and also having a fluid removal passage extending longitudinally of at least the portion thereof which extends through the open end portion of the article, the cross-sectional dimensions of this portion of the elongate hollow structure being sufficiently less than those of the surrounding inner wall of the open end portion of the glass article to define between them an open annular passage for the outflow in contact with said inner wall of part only of the cooling fluid supplied to the interior of said glass article.

11. In apparatus for cooling the internal surface of a hot hollow glass article, such as a bottle or jar, which is open at only one end thereof and is of relatively reduced area in cross-section at its open end, an elongate hollow nozzle structure projecting through the open end of such an article into the interior thereof in spaced relation with the inner wall of the open end portion of the article so that an open annular cooling fluid exhaust passage is defined between said elongate hollow nozzle structure and the relatively reduced open end portion of the article, said nozzle structure being formed to provide therein a longitudinally extending passage for supplying cooling fluid under pressure from an external source to the interior of the body portion of the glass article and a second longitudinally extending passage for exhausting part of the cooling fluid from the interior of the glass article to the exterior thereof.

12. In apparatus for cooling a hot hollow glass article, such as a bottle or jar, which is open at only one end thereof and is of relatively reduced area in cross-section at its open end portion, a cooling fluid applying and exhausting structure comprising an elongate hollow nozzle member projecting into the hollow glass article through and in spaced concentric relation with the inner wall of the open end portion of the glass article, said hollow nozzle member being formed to supply cooling fluid under pressure into the space within the hollow glass article, and a sleeve member projecting through the open end portion of the hollow glass article in spaced relation with both the inner wall of the open end portion of the glass article and with said nozzle member for cooperating with these parts to define an open inner annular passage for outflow of part of the cooling fluid from the interior of the glass article and an open outer annular passage for outflow of another part of said cooling fluid.

13. In the art of cooling hot hollow glass articles, the steps of suddenly subjecting the internal surface of such an article to a blast of cooling fluid directed thereagainst, and continuously relatively rotating and reciprocating the blast and the article during the cooling operation.

14. In the art of tempering hollow glass articles, such as bottles and jars, the steps of heating such an article to a temperature above the strain point of the glass thereof, then suddenly cooling the internal surface of the article by discharging a jet of cooling fluid thereagainst, and continuously relatively rotating and reciprocating the jet of cooling fluid and the article during the cooling operation.

15. In apparatus for tempering hollow glass articles, such as bottles and jars, means for supporting such an article in an upright position when the temperature of the glass of the article is above its strain point, a cooling nozzle adapted to be inserted axially into the article, means for supporting said nozzle for axial movements relative to said first named means along a vertical path extending into said article when the latter is supported by the first named means and for rotary movements about its axis, also relative to said first named means, means for moving said nozzle axially along said vertical path, means for rotating the nozzle about its axis during its axial movements, and means for supplying cooling fluid under pressure to said nozzle during the reciprocatory and rotary movements thereof.

16. In apparatus for cooling hot hollow glass articles, such as bottles and jars, a cooling nozzle adapted to extend into such an article, means for supporting the article and the nozzle in such relative positions that the nozzle extends vertically into the article axially thereof and said nozzle and said article are relatively movable both axially and rotatably, means for relatively rotating and axially reciprocating said nozzle and said article, and means for supplying cooling fluid to said nozzle during said relative rotary and reciprocatory movements.

17. Apparatus for handling and tempering an article of hollow glassware having an opening at one end and a neck finish at the open end thereof, comprising a vertically reciprocable carrier, means for reciprocating said carrier vertically, a tongs mechanism mounted on said carrier for vertical movements as a unit relative to the carrier and comprising cooperative openable and closable tong fingers adapted, when closed, to grip the neck finish of the article of glass ware at a plane below the carrier, means associated with said tongs mechanism to move it vertically as a unit relative to a carrier, an annular disk-like locking member carried by the carrier in position to contact with the open end of said article to cooperate with the tong fingers to lock said article firmly in vertical position when the article has been gripped by the tong fingers and has been moved upward by the tongs into contact with said locking member, a cooling fluid discharge nozzle, means mounted on said carrier to support said nozzle in position to depend vertically through said locking member between said fingers so as to extend downwardly into the interior of the article gripped between the tong fingers and held against said locking member, and means for supplying fluid under pressure to said nozzle.

18. Apparatus for handling and tempering an article of hollow glassware having an opening at one end and a neck finish at the open end thereof, comprising a vertically reciprocable carrier, means for reciprocating said carrier vertically, a tongs mechanism comprising cooperative openable and closable tong fingers and means mounted on said carrier to support the tong fingers for opening and closing movements relative to each other at a plane below the carrier, a cooling fluid discharge nozzle, means mounted on said carrier to support said cooling nozzle in a vertical position and for reciprocation relative to the carrier along a vertical path extending between said tong fingers, means operatively associated with said nozzle to reciprocate it along said path, and means for supplying cooling fluid under pressure to said nozzle.

19. Apparatus for handling and tempering an article of hollow glassware having a neck finish, a vertical spindle, a tongs mechanism comprising a vertically movable annular tongs head reciprocably mounted on said spindle, holders pivotally mounted at their upper ends on said head for swinging movements at their lower ends toward and from the downwardly extended axial line of said head at a level below said spindle, tong fingers carried by said holders and swingable therewith to and from positions to contact with and grip the neck finish of said article of glassware when said article is located in co-axial relation with and below the tongs head with the neck finish of said article interposed between said tong fingers, an elongate cooling fluid discharge nozzle, means mounted on said spindle to support said nozzle in position to depend vertically downward between said tong fingers, means for supplying cooling fluid to said nozzle, means associated with said tongs mechanism to reciprocate said annular tongs head, said holders and the tong fingers vertically on said spindle relative to said nozzle and to close the tong fingers at the beginning of each upward reciprocatory movement thereof, and a stop on said spindle in position to engage with said tongs head to limit downward reciprocatory movement thereof and to then cooperate therewith and with said last named means to open said tong fingers.

20. In apparatus for handling and tempering articles of hollow glassware, a movable, vertical spindle, a plurality of tong fingers for holding between them in an upright position an article of hollow glassware to be tempered, means mounted on said spindle to suspend said tong fingers for opening and closing movements away from and toward the downwardly extended vertical axial line of said spindle at a level below the latter, an elongate cooling fluid discharge nozzle, means for mounting said nozzle on said movable spindle for reciprocatory movements relative to said spindle between a higher position and a position in which said nozzle depends between said tong fingers, means connected with said spindle to move therewith and operatively connected with said nozzle to reciprocate it between said two positions, and connections for supplying fluid to said nozzle.

21. In apparatus for handling and tempering articles of hollow glassware, a movable carrier, a plurality of tong fingers for holding between them an article of hollow glassware to be tempered, means for mounting said tong fingers on said movable carrier for opening and closing movements relative to one another, an elongate cooling fluid discharge nozzle, means for mounting said nozzle on said movable carrier for vertical reciprocation relative thereto and to said tong fingers such that said nozzle projects vertically downward between said tong fingers when the nozzle is at the lower end of its path of reciprocatory movements relative to said movable carrier, connections for supplying cooling fluid to said nozzle, and adjustable means operatively associated with said tong fingers and their movable carrier to variably limit the closing movements of said tong fingers.

22. In apparatus of the character described, a movable carrier, a tongs mechanism comprising a plurality of openable and closable cooperative gripping members and means mounted on said carrier to suspend said gripping members from said carrier for opening and closing movements relative to one another and for rotation in unison about a vertical axis located centrally between said gripping members, means associated with the means to suspend said gripping members from the carrier and cooperative therewith to rotate said gripping members about said axis, and means movably mounted on said carrier in cooperative association with said gripping members to actuate them to effect closing thereof.

23. In apparatus for handling and tempering hollow glass articles having neck finish portions, a vertically disposed individually rotatable tubular member, an individually axially reciprocable second tubular member located within said first tubular member, a tongs mechanism carried by said first tubular member for releasably gripping the neck finish portion of such a hollow glass article to support said article below and in line with the tubular member, a cooling fluid discharge nozzle carried by the second tubular member in position to depend into the thus supported hollow glass article, means to rotate said first tubular member, and means to axially reciprocate said second tubular member.

THOMAS D. GREEN.

REFERENCES CITED

The following references are of record in the file of this patent:

UNITED STATES PATENTS

| Number | Name | Date |
|---|---|---|
| 846,211 | Johnson | Mar. 5, 1907 |
| 1,854,471 | Hofmann | Apr. 19, 1932 |
| 1,869,920 | Soubier | Aug. 2, 1932 |
| 2,054,595 | Clitherow | Sept. 15, 1936 |
| 2,066,283 | Wadman | Dec. 29, 1936 |
| 2,123,145 | Peiler | July 5, 1938 |
| 2,180,737 | Hess | Nov. 21, 1939 |
| 2,198,749 | Weber | Apr. 30, 1940 |
| 2,302,078 | Wadman | Nov. 17, 1942 |
| 2,375,944 | Quentin | May 15, 1945 |

FOREIGN PATENTS

| Number | Country | Date |
|---|---|---|
| 371,090 | Italy | May 11, 1939 |
| 469,994 | Great Britain | Aug. 3, 1937 |
| 482,914 | Great Britain | Apr. 7, 1938 |